US012557190B1

(12) United States Patent
Li et al.

(10) Patent No.: US 12,557,190 B1
(45) Date of Patent: Feb. 17, 2026

(54) ANGLE-ADJUSTABLE LAMP

(71) Applicant: Zhongshan Bestwon Lighting Co., Ltd., Zhongshan (CN)

(72) Inventors: Zongwang Li, Shenzhen (CN); Xu Wang, Shaoyang (CN)

(73) Assignee: Zhongshan Bestwon Lighting Co., Ltd., Zhongshan (CN)

(*) Notice: Subject to any disclaimer, the term of this patent is extended or adjusted under 35 U.S.C. 154(b) by 0 days.

(21) Appl. No.: 19/001,181

(22) Filed: Dec. 24, 2024

(30) Foreign Application Priority Data

Aug. 19, 2024 (CN) ......................... 202422016771.1

(51) Int. Cl.
*F21V 31/00* (2006.01)
*F21V 5/00* (2018.01)
*F21V 21/08* (2006.01)
*F21V 29/74* (2015.01)
*H05B 45/10* (2020.01)
*H05B 47/155* (2020.01)
*F21Y 115/10* (2016.01)

(52) U.S. Cl.
CPC ............. *H05B 45/10* (2020.01); *F21V 5/007* (2013.01); *F21V 21/08* (2013.01); *F21V 29/74* (2015.01); *F21V 31/005* (2013.01); *H05B 47/155* (2020.01); *F21Y 2115/10* (2016.08)

(58) Field of Classification Search
CPC .......... F21V 29/773; F21V 21/30; F21V 5/04; F21V 5/007; F21V 15/01; F21V 23/023; F21V 31/005; F21V 29/74; F21V 31/00; F21V 21/08; F21V 5/00
See application file for complete search history.

(56) References Cited

U.S. PATENT DOCUMENTS 10,767,849 B2 * 9/2020 Cattoni .................... F21V 29/76
2013/0265752 A1 * 10/2013 Shimizu ................ F21V 29/773
362/330

FOREIGN PATENT DOCUMENTS

CN 204785880 U 11/2015
CN 206191426 U 5/2017
CN 208397887 U 1/2019

* cited by examiner

*Primary Examiner* — William J Carter
(74) *Attorney, Agent, or Firm* — Nitin Kaushik

(57) ABSTRACT

The present disclosure claims an angle-adjustable lamp, comprising a controller, a lamp panel and a light transmission panel covered on the lamp panel. The lamp panel is provided with multiple LED beads, and the light transmission panel is provided with one plane light transmission area and two lens areas. The lens area is provided with multiple lenses, and each of the lenses corresponds to an LED bead directly below it to deflect the light transmission angle of the LED bead.

8 Claims, 2 Drawing Sheets

ANGLE-ADJUSTABLE LAMP

CROSS-REFERENCE TO RELATED APPLICATIONS

The application claims priority to Chinese patent application No. 2024220167711, filed on Aug. 19, 2024, the entire contents of which are incorporated herein by reference.

TECHNICAL FIELD

The present disclosure relates to the technical field of lamps, in particular to an angle-adjustable lamp.

BACKGROUND

Most of the existing lamps have only one lighting angle, which cannot meet the requirements of lighting a designated area on a site. In most cases, switching of a luminous angle is realized through a high-cost electrically-controlled dimming mode, or lens replacement that requires manual work, or multiple lenses to match a lamp panel. This last solution requires a large size of light source surfaces, resulting in clumsy and low cost performance of products.

SUMMARY

The purpose of the present disclosure is to solve at least one of the technical challenges existing in the prior art, and propose an angle-adjustable lamp that facilitates adjusting the luminous angle and requires a smaller light source surface.

The angle-adjustable lamp according to embodiments of the present disclosure comprises a lamp panel and a light transmission panel covered on the lamp panel. The lamp panel is provided with multiple LED beads, the light transmission panel is provided with one plane light transmission area and two lens areas, and the plane light transmission area is located between the two lens areas. The lens area is provided with multiple lenses, and each of the lenses corresponds to an LED bead directly below it to deflect the light transmission angle of the LED bead.

According to some embodiments of the present disclosure, a controller is included, wherein the controller is electrically connected with the lamp panel to respectively control brightness of the LED beads corresponding to the plane light transmission area and brightness of the LED beads corresponding to the lens area.

According to some embodiments of the present disclosure, a light transmission angle of the plane light transmission area is $\delta 1$, a light transmission angle of the lens area is $\delta 2$, and $\delta 2$ is inversely proportional to brightness of the LED bead corresponding to the lens area.

According to some embodiments of the present disclosure, the ratio of an area S1 of the plane light transmission area to an area S2 of the two lens areas is S1/S2, making the overall light emitting angle of the lamp $\delta=\delta 1*S1/(S1+S2)-\delta 2*S2/(S1+S2)$.

The angle adjustable lamp according to embodiments of the present disclosure has at least the following beneficial effects: The angle of light transmitted by an LED bead through the plane light transmission area and the lens area is related to the light emitting angle and brightness of the LED bead itself, and the LED bead transmits light after being deflected by the lens area, so that the light emitting angle changes. Therefore, control of multiple light emitting angles can be realized only by controlling brightness of the LED bead, with no necessity to replace lenses. For instance, when an LED bead in the lens area fails to illuminate, the overall light emitting angle is the light emitting angle of the plane light transmission area (i.e., the light emitting angle of the LED bead itself). Since the plane light transmission area is located in between the two lens areas, the brighter an LED bead in the lens area is, the larger the light emitting deflection angle of the lens toward the plane light transmission area, and the narrower the overall light emitting range, thus allowing for the adjustment of multiple light emitting angles.

Additional aspects and advantages of the present disclosure will be given in the following description part, which will become apparent in part from the following description, or as will be understood from the practice of the present disclosure.

BRIEF DESCRIPTION OF DRAWINGS

The present disclosure will be further described below with reference to the drawings.

DETAILED DESCRIPTION OF THE EMBODIMENTS

Figure 1:
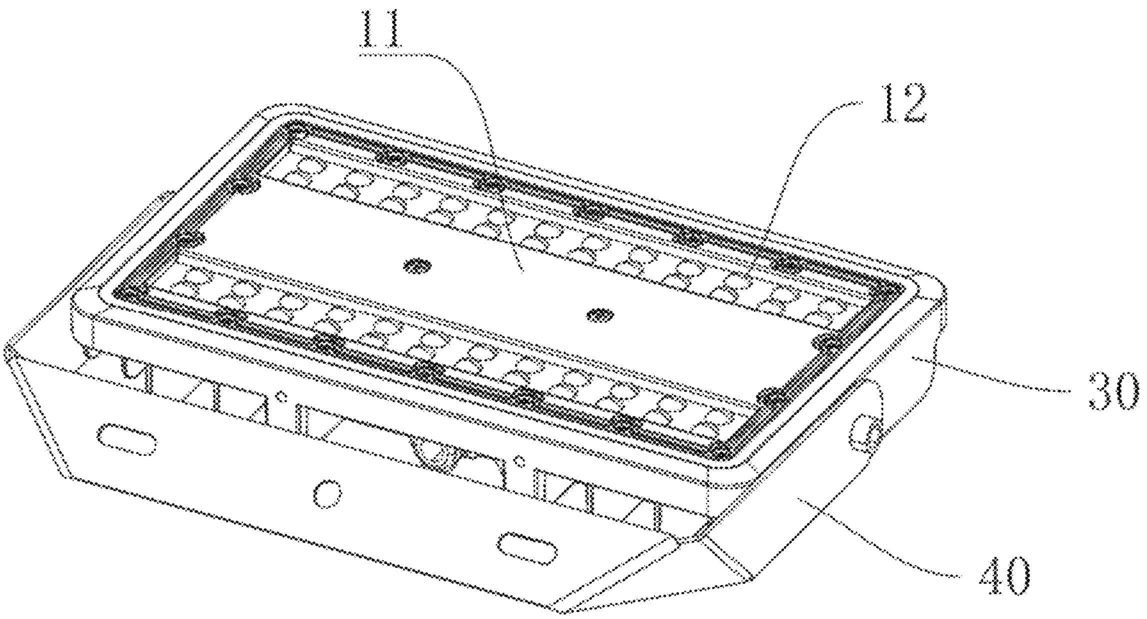
FIG. 1 is an overall structural diagram of an angle-adjustable lamp.

This part will describe the specific embodiments of the present disclosure in detail. The preferred embodiments of the present disclosure are as illustrated in the accompanying drawings, which serve to supplement the description of the text part of the specification with graphics so that people can visually and vividly understand each technical feature and overall technical solution of the present disclosure, but they cannot be understood as restrictions on the protection scope of the present disclosure.

In the description of the present disclosure, it should be understood that the azimuth or positional relationship related to the orientation description, such as "up", "down", "front", "rear", "left" and "right", is based on the azimuth or positional relationship shown in the drawings, which is only for facilitating the description of the present disclosure and simplifying the description, rather than indicating or implying that the target device or component must have a specific orientation and be structured and operated at a specific orientation, so it cannot be construed as limiting the present disclosure.

In the description of the present disclosure, "several" means one or more, and "multiple" means more than two; "greater than", "less than", "exceeding", etc. are understood as excluding the number itself, and "above", "below", "within", etc. are understood as including the number itself. If there is a description that the "first" and "second" are only for the purpose of distinguishing technical features, it cannot be understood as indicating or implying relative importance, implying the number of indicated technical features or implying the sequential relationship between the indicated technical features.

Figure 2:
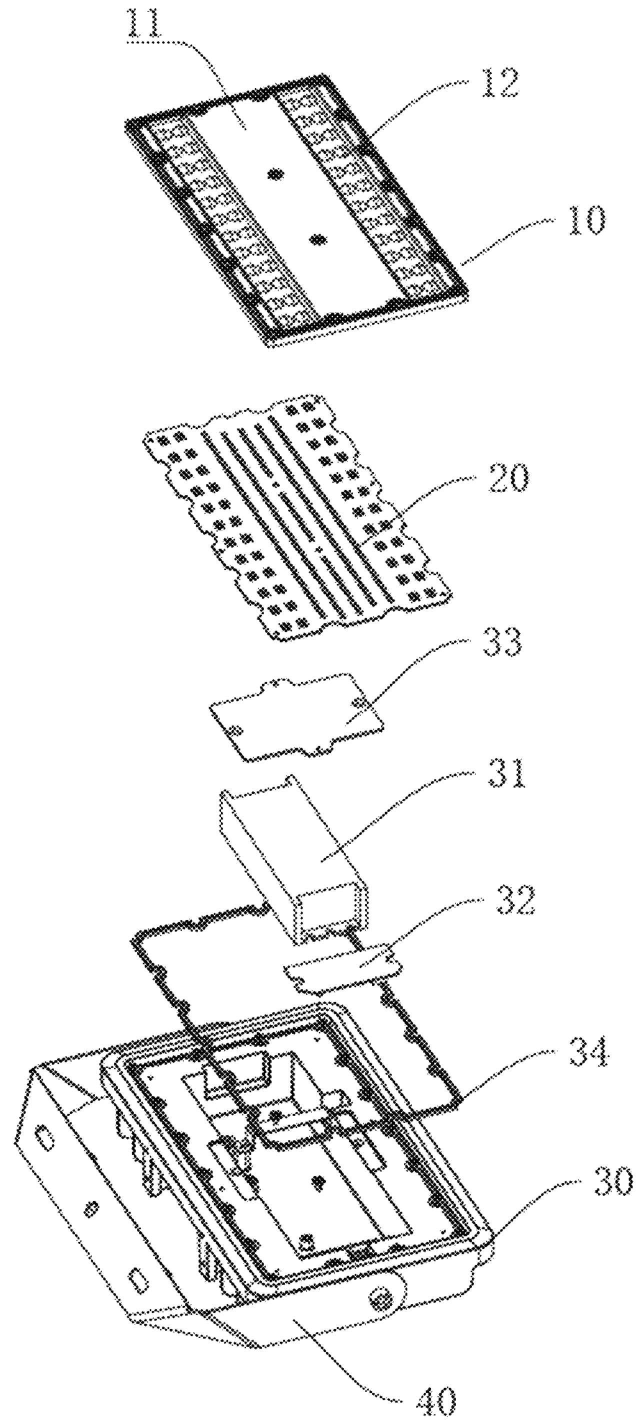
FIG. 2 is an exploded view of the angle-adjustable lamp.

Referring to FIGS. 1 to 2, an angle-adjustable lamp according to the present disclosure comprises a controller 32, a lamp panel 20 and a light transmission panel 10 covered on the lamp panel 20. The lamp panel 20 is provided with multiple LED beads, and the light transmission panel 10 is provided with one plane light transmission area 11 and two lens areas 12, the plane light transmission area 11 is located between the two lens areas 12. The lens area 12 is provided with multiple lenses, each of the lenses corresponds to an LED bead directly below it to deflect the light transmission angle of the LED bead. The controller 32 is electrically connected with the lamp panel 20 to respectively control brightness of the LED beads corresponding to the plane light transmission area 11 and brightness of the LED beads corresponding to the lens area 12.

A light transmission angle of the plane light transmission area 11 is δ1, and δ1 is consistent with the light emitting angle of the LED bead corresponding to the plane light transmission area 11 (the value range of δ1 is not limited herein; preferably, δ1 is 90°~120°), and the light transmission angle of the lens area 12 is δ2 (of course, the value range of δ2 is not limited herein; preferably, δ2 is generally 30°~60°). According to the optical principle of the lens, it can be known that δ2 is inversely proportional to brightness of the LED bead corresponding to the lens area 12, that is, the greater the brightness, the smaller δ2 will be. The ratio of an area S1 of the plane light transmission area 11 to an area S2 of the two lens areas 12 is S1/S2, making the overall light emitting angle of the lamp $\delta=\delta1*S1/(S1+S2)-\delta2*S2/(S1+S2)$. For instance, if δ1=120°, δ2=45° and S1/S2=7/3, then $\delta-(120*0.7)-(45*0.3)=70°$. Practices have shown that the overall light emitting angle δ of lamps ranges from 60° to 120°.

The angle of light transmitted by an LED bead through the plane light transmission area 11 and the lens area 12 is related to the light emitting angle and brightness of the LED bead itself, and the LED bead transmits light after being deflected by the lens area 12, so that the light emitting angle changes. Therefore, control of multiple light emitting angles can be realized only by controlling brightness of the LED beads in the plane light transmission area 11 and the lens area 12, with no necessity to replace lenses. For instance, when an LED bead in the lens area 12 fails to illuminate, the overall light emitting angle is the light emitting angle of the plane light transmission area 11. Since the plane light transmission area 11 is located in between the two lens areas 12, the brighter an LED bead in the lens area 12 is, the larger the light emitting deflection angle of the lens toward the plane light transmission area, and the narrower the overall light emitting range, thus allowing for the adjustment of multiple light emitting angles.

As shown in FIG. 2, the present disclosure further comprises a power supply unit 31, a pressing plate 33, a waterproof ring 34 and a bottom housing 30 for heat dissipation. The bottom housing 30 is provided with cooling fins to further improve the heat dissipation efficiency. A mounting groove is formed inside the bottom housing 30. The power supply unit 31 and the controller 32 are respectively disposed in the mounting groove. The lamp panel 20 is located above the power supply unit 31 and the controller 32. The light transmission panel 10 is connected to the bottom housing 30 for sealing an opening of the bottom housing 30. The pressing plate 33 is located above the power supply unit 31 to be connected with the bottom housing 30, and the lamp panel 20 is located above the pressing plate 33. The pressing plate 33 is used for fixing the power supply unit 31. The waterproof ring 34 is located between the light transmission panel 10 and the bottom housing 30.

Furthermore, the present disclosure further comprises a mounting arm 40. The mounting arm 40 is fixedly connected or rotatably connected with the bottom housing 30 to facilitate the installation of the lamp, and the rotatable connection is convenient for adjusting the illumination angle.

Those skilled in the art can easily understand that, on the premise of no conflict, the above preferred modes may be freely combined and superimposed.

The above are only preferred embodiments of the present disclosure, and do not limit the patent scope of the present disclosure. Under the inventive concept of the present disclosure, any equivalent structure transformation made by using the contents of the description and drawings of the present disclosure or directly or indirectly applied to other related technical fields shall be included in the patent protection scope of the present disclosure.

What is claimed is:

1. An angle-adjustable lamp, comprising:

a lamp panel (20) and a light transmission panel (10) covering on the lamp panel (20), wherein the lamp panel (20) is provided with multiple LED beads, the light transmission panel (10) is provided with one plane light transmission area (11) and two lens areas (12), the plane light transmission area (11) is located between the two lens areas (12), each lens area (12) is provided with multiple lenses, and each of the lenses corresponds to an LED bead directly below it to deflect the light transmission angle of the LED bead;

a light transmission angle of the plane light transmission area (11) is δ1, δ1 is consistent with a light emitting angle of the LED beads corresponding to the plane light transmission area (11), a light transmission angle of the two lens areas (12) is δ2, and δ2 is inversely proportional to brightness of the LED beads corresponding to the two lens areas (12).

2. The angle-adjustable lamp according to claim 1, comprising a controller (32), wherein the controller (32) is electrically connected with the lamp panel (20) to respectively control brightness of the LED beads corresponding to the plane light transmission area (11) and brightness of the LED beads corresponding to the two lens areas (12).

3. The angle-adjustable lamp according to claim 2, further comprising a bottom housing (30) and a power supply unit (31), wherein the bottom housing (30) is internally provided with a mounting groove, the power supply unit (31) and the controller (32) are respectively arranged in the mounting groove, the lamp panel (20) is located above the power supply unit (31) and the controller (32) respectively, and the light transmission panel (10) is connected to the bottom housing (30) for sealing an opening of the bottom housing (30).

4. The angle-adjustable lamp according to claim 3, further comprising a pressing plate (33), wherein the pressing plate (33) is located above the power supply unit (31) to be connected with the bottom housing (30), and the lamp panel (20) is located above the pressing plate (33).

5. The angle-adjustable lamp according to claim 4, wherein the bottom housing (30) is provided with cooling fins.

6. The angle-adjustable lamp according to claim 4, further comprising a waterproof ring (34), and the waterproof ring (34) is located between the light transmission panel (10) and the bottom housing (30).

7. The angle-adjustable lamp according to claim 4, further comprising a mounting arm (40), and the mounting arm (40) is fixedly connected or rotatably connected with the bottom housing (30).

8. The angle-adjustable lamp according to claim 1, wherein the ratio of an area S1 of the plane light transmission area (11) to an area S2 of the two lens areas (12) is S1/S2, making the overall light emitting angle of the lamp $\delta=\delta1*S1/(S1+S2)-\delta2*S2/(S1+S2)$.

* * * * *